Feb. 5, 1946. L. W. IMM 2,394,180
POWER COMPUTER
Filed Jan. 2, 1940 5 Sheets-Sheet 1

Fig. 1.

INVENTOR.
LEWIS W. IMM.
BY
ATTORNEY

Feb. 5, 1946.   L. W. IMM   2,394,180
POWER COMPUTER
Filed Jan. 2, 1940   5 Sheets-Sheet 2

Fig. 2

INVENTOR,
LEWIS W. IMM.
BY
ATTORNEY

Patented Feb. 5, 1946

2,394,180

UNITED STATES PATENT OFFICE 2,394,180

POWER COMPUTER

Lewis W. Imm, Glendale, Calif., assignor to Librascope, Incorporated, Burbank, Calif., a corporation of California Application January 2, 1940, Serial No. 311,982

11 Claims. (Cl. 235—61)

The present invention relates to computing devices, and particularly to an instrument for correlating a plurality of factors affecting internal combustion engine efficiency and power output.

The invention is disclosed as embodied in a computer especially designed for use in aircraft, where it is particularly useful because the pilot is ordinarily occupied with the control of the ship and can not give attention to involved mathematical calculations calling for mental concentration. Furthermore, in aircraft, many variable factors affecting engine efficiency are present, such as carburetor temperature and pressure altitude, which are not of importance in other applications.

Instruments are provided in aircraft to indicate motor speed, manifold pressure, carburetor temperature, and pressure altitude. From this data the horsepower output, rate of fuel consumption, and brake mean effective pressure must be computed if the power plant is to be operated at maximum efficiency. Thereafter, as changes in any of the indicated factors occur, such as altitude, a recomputation must be made in order to determine the direction and extent of changes which must be made in other factors, such as manifold pressure, in order to maintain maximum efficiency at the desired power output.

The instrument embodying the present invention hereinafter described will, when the pilot sets pointers therein to scale values of revolutions per minute, manifold pressure, pressure altitude, and carburetor temperature, as read from his instruments, mechanically coordinate these values and indicate immediately the values of horsepower, fuel consumption, and brake mean effective pressure at which his engine is operating.

In the following explanation and specification, the speed in revolutions per minute will be abbreviated as R. P. M.; the manifold pressure in inches of mercury as M. P.; the pressure altitude effect in feet as A.; the brake mean effective pressure, a figure of merit derived by averaging the cylinder pressure over the entire firing stroke, will be indicated in pounds per square inch, as B. M. E. P.; carburetor temperature in degrees Fahrenheit will be abbreviated as T.; the fuel consumption in gallons per hour will be noted as F. C.; and the output to the propeller in horsepower will be abbreviated as H. P.

It will be observed that the device need not allow for all factors affecting engine performance, but should include those under the control of the pilot having the most important effects on efficiency.

The primary object of the invention is to enable the pilot to obtain rapidly and easily the effect on his engine performance of various values of R. P. M., M. P., A., and T.

Other objects are:

To coordinate instantaneously the effects of R. P. M., M. P., A., and T., on H. P., F. C., and B. M. E. P.;

To eliminate the necessity for calculations and the use of charts by the pilot or an engineering officer in determining the proper adjustment of his engine;

To give information to the operator so that he can more efficiently operate the aircraft engines;

To enable the operator to predict accurately the effect of changing certain factors on the operation of his engine;

To give information to the operator so that he can secure maximum efficiency by making possible operation near the preferred B. M. E. P. rating of the engine;

To show, for any operating conditions, the rate of fuel consumption;

To give information to the operator so as to enable him to adjust the speed and other factors of the flight to the amount of gas available in his tanks; and To give information to the operator so that he may minimize wear and stress on the engine parts by operating in proper relation to the optimum B. M. E. P. values at any speed.

The invention possesses numerous other objects and features of advantages, some of which, together with the foregoing, will be set forth in the following description of specific apparatus embodying and utilizing this invention. It is to be understood that the principles of the invention are applicable to other apparatus, however, and that it is not limited in any way to the showing of the present application, as various other embodiments of the invention may be adopted within the scope of the appended claims.

These objects, and the following description, may be better understood by reference to the drawings, wherein.

In order to make clear the theoretical considerations upon which the design of a device embodying the present invention must be based, the way in which the set values of R. P. M., M. P., A., and T. are combined to indicate H. P., F. C., and B. M. E. P. will be considered, first evaluating the influence of each on the H. P. Under standard conditions of temperature and pressure at sea level; that is, 59° F., and 29.92 in. Hg, at 0 ft. elevation, horsepower is given by the known theoretical equation:

$$\text{H.P.} = \frac{\text{B. M.E.P.} \times D \times \text{R.P.M.}}{33000 \times 2} \quad (1)$$

Where

B. M. E. P. = average cylinder pressure throughout the firing stroke.

D = total displacement of all of the pistons, and $\frac{\text{R. P. M.}}{2}$ = number of firing strokes per minute in a four-cycle engine.

Since the displacement is fixed by the engine design, it is obvious that the H. P. theoretically varies with the B. M. E. P. and the R. P. M.

Many other factors, however, influence the actual power output; for example, friction, scavenging, timing, M. P., fuel-air ratio, and combustion efficiency. It has not been found possible to combine these factors in a general equation of useful form, so it has been necessary to rely on test data, and to vary the specific dimensions of the parts of the instrument in accordance with the data obtained from tests with each different type of engine. From this data, empirical equations are derived for power change in terms of each of the variables under the pilot's control, and these equations determine the design of the computing mechanism.

As an example, test figures will be given for a particular engine of 1830 cu. in. displacement developing 343 actual H. P. at 1650 R. P. M. and 24 in. Hg M. P. under standard conditions of altitude and temperature. The effect of speed changes on the power output was first determined. It was found, by test, that the output was raised to 520 H. P. by increasing the speed to 2550 R. P. M., a change of 177 H. P. Thus the average rate of increase was $$\frac{520 - 343}{2550 - 1650} \text{ or } \frac{177}{900} \text{ H.P. per unit R.P.M.}$$

increase within the range of 1650 to 2550, and the increase in H. P. is $$\frac{177}{900} \times \text{increase of R.P.M}$$

An extrapolation formula whereby the horsepower developed at any speed above or below 1650 R. P. M. may be determined may therefore be stated as:

$$\alpha \text{ H. P.} = .1966 \, (\text{R. P. M.} - 1650) \quad (2)$$

where "$\alpha$ H. P." is the positive or negative change in horsepower from the basic value of 343 H. P. effected by altering speed alone.

A study of the power curves shows, however, that the increase of H. P. per unit increase of R. P. M. decreases towards the higher values of R. P. M. and so Equation 2 must be modified by inserting an empirical multiplying factor which was determined from such a study to be satisfactorily expressed as:

$$\left[1 + .5\left(\frac{2550 - \text{R. P. M.}}{2550 - 1650}\right)\right]$$

after which formula (2) becomes $$\alpha \text{ H. P.} = \left[1 + .5\left(\frac{2550 - \text{R. P. M.}}{900}\right)\right] \times .1966(\text{R.P.M.} - 1650) \quad (3)$$

Consider next the effect of increasing the M. P., other factors being held as at the beginning of the test for R. P. M. change: increasing the M. P. from 24 to 37 in. Hg while holding the R. P. M. at 1650 increases the output from 343 H. P. to 680 H. P., a change of 337 H. P. Thus the average rate of increase is $$\frac{680 - 343}{37 - 24} \text{ or } \frac{337}{13} \text{ H.P. per unit M.P.}$$

increase within the range of 24 to 37 in. Hg, or H. P. increase is equal to $$\frac{337}{13} \times \text{increase in M.P.}$$

An extrapolation formula whereby the horsepower developed at any manifold pressure above or below 24 in. Hg may be determined may therefore be stated as:

$$\beta \text{ H. P.} = 25.92 \, (\text{M. P.} - 24) \quad (4)$$

where "$\beta$ H. P." is the positive or negative change in horsepower from the basic value of 343 H. P. effected by altering manifold pressure alone.

It is found by actual test, however, that if the M. P. is held at 37 in. Hg, and the speed again raised to 2550 R. P. M., a further increase in power occurs to 915 H. P., a change of 235 H. P., which is 235 − 177, or 58 H. P. more than the addition produced by the same speed increase at the lower value of M. P. Hence an additional factor must be added to show correctly the H. P. change when both R. P. M. and M. P. are varied. This combination factor, following the same procedure as used in deriving Equations 3 and 4 above, can be written as $$\frac{235 - 177}{(37 - 24)(2550 - 1650)} \times \text{R. P.M. increase} \times \text{M. P.}$$

increase. An extrapolation formula whereby the difference between the change in H. P. effected by altering M. P. or R. P. M. alone and the change in H. P. effected by concurrent alteration of M. P. and R. P. M. may be determined, may therefore be stated as:

$$\gamma \text{ H. P.} = .00496 \, (\text{R. P. M.} - 1650)(\text{M. P.} - 24) \quad (5)$$

where "$\gamma$ H. P." is the positive or negative change in H. P. from the basic value of 343 H. P. effected by concurrent alteration of manifold pressure and speed.

The total H. P. change due to variations in speed and manifold pressure is the sum of Equations 3, 4, and 5, and when algebraically added to the original base power output, gives, for any M. P. and R. P. M. within the operating range:

$$\text{H. P.} = 343 + \left[1 + .5\left(\frac{2550 - \text{R.P.M.}}{900}\right)\right] \times .1966(\text{R.P.M.} - 1650) + 25.92 \, (\text{M.P.} - 24) + .00496(\text{R.P.M.} - 1650)(\text{M.P.} - 24) \quad (6)$$

Changes in altitude have various and conflicting effects on horsepower developed by an internal combustion engine. By standard thermodynamic equations, the power is proportional to the difference between the carburetor and exhaust temperatures in degrees absolute during the firing stroke. At higher altitudes, the back exhaust pressure is reduced, and consequently the exhaust temperature; so a greater proportion of the energy in the heat cycle is available, and the power is increased.

To offset this effect, the reduced density of air at higher altitudes means a smaller supply of oxygen and less complete combustion; while the reduced temperature of the entering air means a lower maximum temperature during the firing cycle.

These power-reducing tendencies are again opposed by the greater density per unit volume of air at reduced temperatures, and by the use of a supercharger at higher altitudes which supplies air in volume sufficient for combustion at normal efficiency.

The sum of these influences acting to increase and decrease the power is practically, as shown by the tests mentioned above, dependent on the altitude alone.

The effect of altitude at any value of M. P. and R. P. M. was found from tests to be capable of representation by the equation $$\triangle H.P. = R\left(\frac{A.}{10,000}\right)\left(2.1 - \frac{A.}{50,000}\right)$$

where R is the increase of H. P. from sea level to 5000 feet. For the tested engine, R was 50 H. P. Hence, $$\triangle H.P. = 50\left(\frac{A.}{10,000}\right)\left(2.1 - \frac{A.}{50,000}\right) \quad (7)$$

It was found that this increase was practically independent of M. P., R. P. M., and H. P., where standard altitude conditions were maintained, the error due to neglect of these factors being less than one per cent, and the tests extending from 0 to 25,000 feet elevation.

A comparable test of the effect of carburetor temperature changes showed that it could be represented by a constant times the deviation from standard temperature for any given altitude, times the power. Since the constant was the same for all engines tested, this becomes, where $T^d$ is the deviation from standard temperature for the given altitude:

$$\epsilon H.P. = .00105 \times T.^d \times H.P. \quad (8)$$

where $\epsilon H. P.$ is the positive or negative change in H. P. effected by deviation of carburetor temperature from standard temperature for a given altitude.

For this particular engine, the H. P. for any value of R. P. M., M. P., A., and T., is, within the tested ranges, the algebraic sum of Equations 6, 7, and 8, or:

Total H. P. = 343 +

(from 3)

$$\left[1 + .5\left(\frac{2550 - R.P.M.}{900}\right)\right] \times .1966(R.P.M. - 1650) +$$

(from 4)

$$25.92(M.P. - 24) +$$

(from 5)

$$.00496(R.P.M. - 1650)(M.P. - 24) +$$

(from 7)

$$50\left(\frac{A}{10,000}\right)\left(2.1 - \frac{A}{50,000}\right) +$$

(from 8)

$$.00105 \times T^d \times H.P. \quad (9)$$

It has been found that in use the relations of Equation 9 may be extrapolated beyond the limits of the basic tests with good accuracy. The method of extending the scale calibrations will be explained hereafter. The presence of the H. P. element in the last factor: to-wit, the temperature correction of Equation 8, is properly cared for in the device, as will be seen from the following description, by making this correction from a multiplying factor on the H. P. value as totaled from the other factors.

The details of the mechanism will now be referred to in order that the mechanical arrangement which is necessary to effect solution of Equation 9 may be understood.

Figure 5:
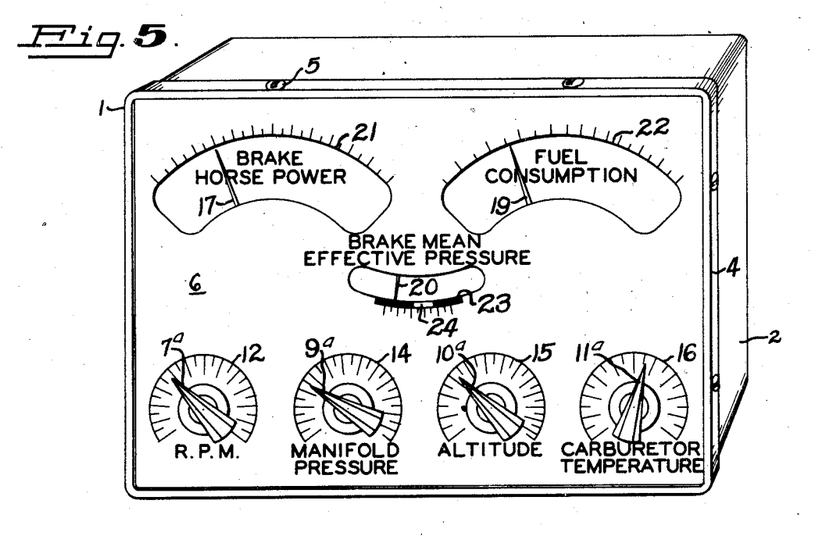
Figure 5 is a front perspective view of my device mounted in its case.

In Figure 5 there is shown the device 1 enclosed in a case 2. The case may be formed of steel or of any strong, light material, pressed or otherwise shaped into a shallow rectangular box, open at the front. A closure rim 4 is fastened by screws 5 to the case 2 about its open face, and is arranged to hold in position a face plate 6 which nests snugly into the case 2 and supports the working parts. The plate may be engaged by the same screws 5 which secure the rim 4. Plate 6 is preferably made of a strong but easily worked, non-tarnishing, light material.

Four pointer-type knobs, 7ª, 9ª, 10ª, and 11ª are removably mounted on shafts 7, 9, 10, and 11 respectively, journaled in a horizontal row on the face plate 6 near the bottom thereof. These knobs indicate R. P. M., M. P., A., and T., respectively, and are set by the operator in accordance with his instrument readings, over scales 12, 14, 15, and 16, respectively. In the particular case outlined above, the graduations of scale 12 would preferably be from 1500 to 2700 R. P. M.; of scale 14, from 20 to 45 inches of mercury; scale 15, from 0 to 25,000 feet altitude; and of scale 16, from —60 to +140° F. Obviously, the specific graduations may vary for different engines, however, and so they have not been applied to the figure.

In the upper portion of the plate 6 are symmetrically disposed two scale-bearing windows 21 and 22, on which may be read brake horsepower and fuel consumption, respectively, in accordance with the positions of their respective pointers 17 and 19, which are supported, in a manner to be described later, from the rear of plate 6. A pointer 20 is also mounted on the rear of plate 6, and indicates brake mean effective pressure by its position behind a scale-bearing window 23, formed centrally of the plate 6. The graduations on window 21 preferably would range in the above case from 100 to 1400 H. P., those on window 22 would show a fuel consumption range from 15 to 160 gallons of gasoline per hour, and those on window 23 would indicate B. M. E. P. values from 100 to 200 pounds per square inch cylinder pressure, with a zone 24 marked to show the optimum range for the particular engine. Obviously, these ranges may change with different engines.

Figure 1:
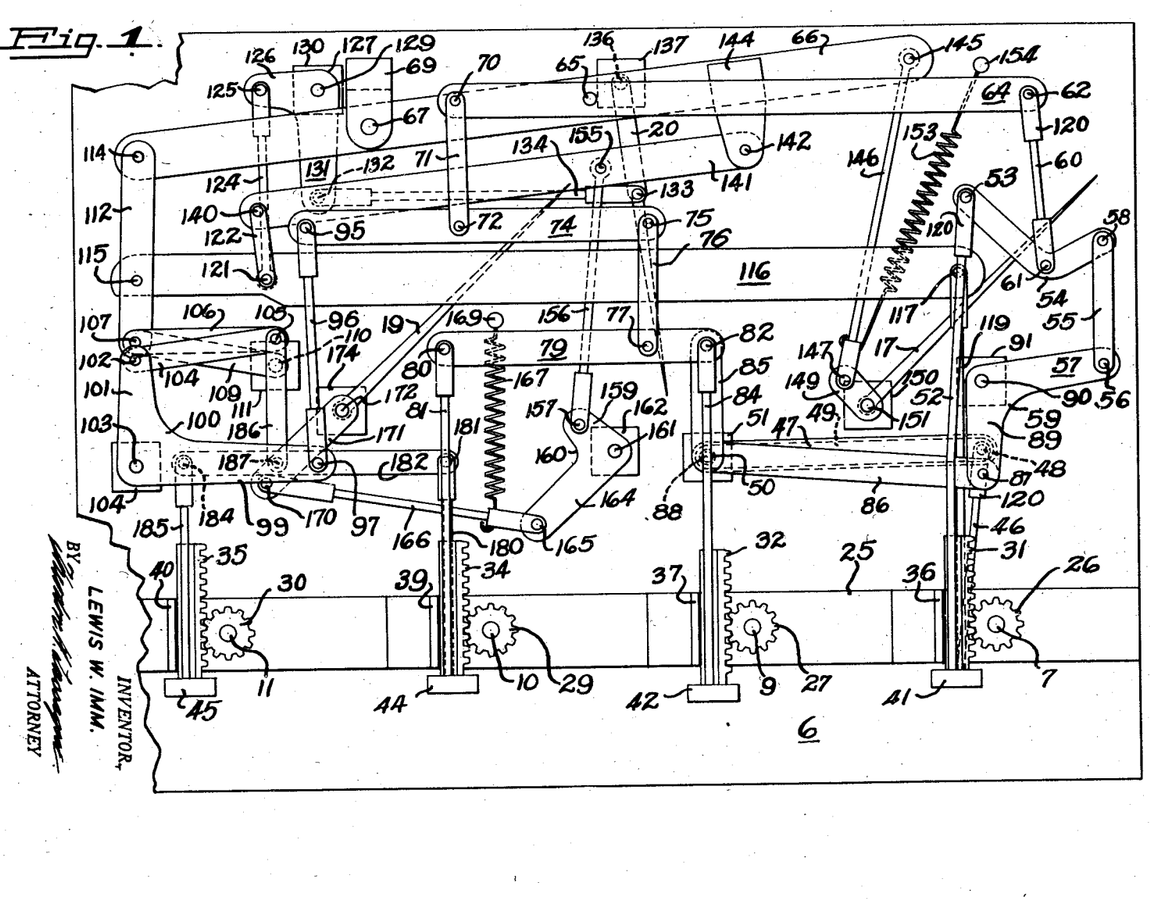
Figure 1 is a plan view, taken from the rear, of the mechanical linkages of my device.

Referring now to Figure 1, the device is shown from the rear of plate 6, with the case 2 removed. A horizontal supporting strip 25 is mounted on, but separated slightly from the plate 6 by suitable spacers, not shown. This strip 25 is in position to act as a second bearing support for those portions of shafts 7, 9, 10, and 11 which extend through plate 6 and the strip 25, and to which are fixed pinions 26, 27, 29, and 30, respectively. Each pinion is held in engagement with a corresponding rack 31, 32, 34, and 35, the racks being urged against the pinions by resilient angle pieces 36, 37, 39, and 40 secured to the supporting strip 25.

Blocks 41, 42, 44, and 45 fixed to the bottom of the racks 31, 32, 34, and 35, respectively, act as bases for the attachment of connecting rods, formed preferably of an easily worked resilient material such as brass, which carry the movement of the respective knobs to the linkages controlling the pointers 17, 19, and 20. To either or both ends of these connecting rods, and to those to be described below, there is attached a yoke fitting 120 which is arranged for pivotal connection to an associated member and for adjustment to control the length of the connecting rod from block to pivot. This arrangement is wholly convention; for example, a threaded rod cooperating with an internally threaded fitting, and has not been illustrated in detail. Any type of adjustable connection permitting removal of any individual rod without disturbing others is fully equivalent. The setting knobs, the shafts on which they are mounted, their respective pinions, racks and blocks 41, 42, 44 and 45 are considered as the respective setting means or the settable factor entering means by which various values are entered.

The linkages by means of which the effect of R. P. M. change is carried from rack 31 to pointer 17 in accordance with Equation 3 will be described next, reference being had to Figure 2 which shows the positions for the maximum R. P. M. on the above described scale.

Figure 2:
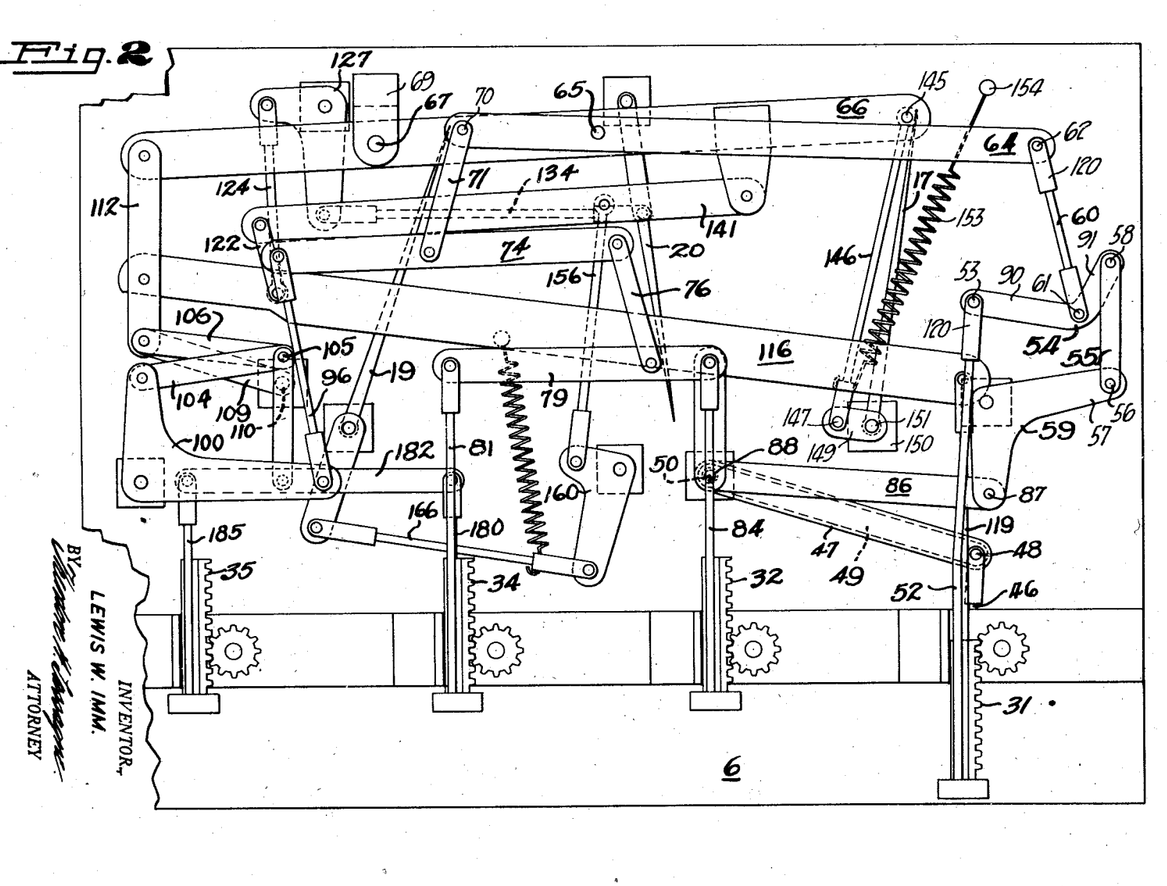
Figure 2 is a rear plan view showing the position of the linkages when the R. P. M. indicator is set at its maximum value, and the other indicators remain at minimum value positions, the linkage comprising lever 74 and links 71, 76, and 96 being shown displaced slightly to the left to more clearly show underlying parts.

Movement of rack 31 must produce a displacement of the pointer 17 proportional to .1966 (R. P. M.—1650) multiplied by $$\left[1+.5\left(\frac{2550-\text{R.P.M.}}{900}\right)\right]$$

Entry of the first of these factors requires only that the movement of pointer 17 be directly proportional to the movement of rack 31, and such a factor can be entered by conventional linkages designed to transmit movement of the rack to the pointer in the proportion indicated by the factor. Entry of the second factor, however, requires that the rate of movement of pointer 17 by rack 31 decrease as the rack is lowered.

Such movement of pointer 17 by rack 31 is accomplished by pivotally connecting a rod 52, attached to rack 31, to a specially shaped lever 54 pivotally mounted at 58 and pivotally connected intermediate its ends at 61 to a rod 60 whereby the resultant movement is transmitted to pointer 17.

As the pivotal connection 53 between rod 52 and lever 54 is lowered, lever 54 is rocked counterclockwise about its pivot 58 (which may be regarded as a fixed pivot for the purpose of the present portion of the description), and pivot 61 is lowered. The lever 54 is curved to place the pivot 61 initially closer to a position vertically below pivot 58 and thus cause the rate at which pivot 61 is lowered to decrease as sharply as is required by the second factor of the formula under consideration. The curvature of lever 54 may of course be made greater or smaller to conform to formulae derived from the test data on various engines for which specific instruments may be designed.

The linkage which transmits the vertical displacement of rod 60 to pointer 17 comprises lever 64 pivotally connected to rod 60 by pin 62 through adjustable fitting 120. Lever 64 is in turn pivotally connected at 65 to a lever 66, the latter being rockable about a fixed pivot 67 in a block 69 attached to the plate 6.

When rod 60 pulls down on lever 64, the latter is forced to pivot not only about its pivotal connection 65, but also about a pin 70 by which lever 64 is attached to a link 71 at the end opposite pin 62. Link 71 leads to the other racks by linkages to be described subsequently, and its position may be considered as fixed for the purpose of the present portion of the description. Therefore, when rod 60 is drawn downward, the pivot 65 is displaced downward, carrying with it lever 66. Lever 66 carries a pivot 145 connecting through a rod 146 and pivot 147 to a lever 149, fixed in turn to a shaft 151 rotatably mounted in a bearing block 150. Shaft 151 carries the H. P. pointer 17, which is seen from the front of plate 6 through the window 21, and is moved through the described linkages in proportion to the rotation of the R. P. M. knob 7, in accordance with Equation 3. Window 21, and the corresponding windows 22 and 23 seen in Figure 5, have been omitted from the showing in Figures 1 to 4 to avoid confusion. A tension spring 153, attached to a stud 154 on plate 6, urges connecting rod 146, and through it the H. P. pointer 17, toward its minimum value position.

Figure 3:
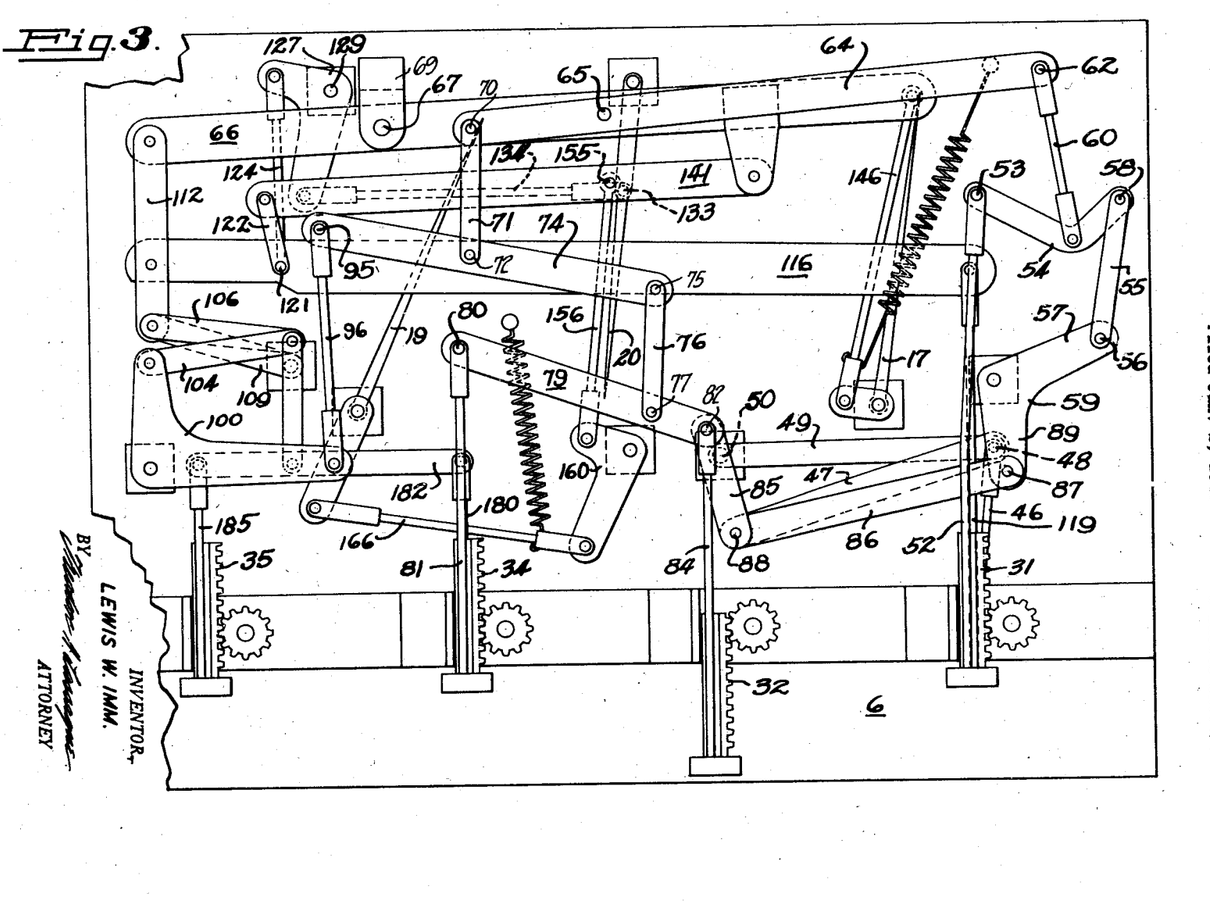
Figure 3 is a rear plan view showing linkage positions for maximum M. P. values, the others remaining at minimum value positions.

The next sequence of linkages to be described is that by which the effect of M. P. changes is introduced. By Equation 4, the H. P. change bears a linear relation to M. P. changes, and so the vertical displacement of rack 32 must be proportional to that imparted to the connecting rod 146 which directly controls movement of the H. P. pointer 17. The positions of the linkages are shown in Figure 3 for maximum M. P. values on the scales described.

A connecting rod 84 is fixed to rack 32, and is pivotally linked by pin 82 to a horizontal lever 79. The opposite end of lever 79 bears a pin 80 joined to a connecting rod 81, in turn attached to the A. rack 34. When only the M. P. setting is changed, pin 80 acts as a fixed pivot for lever 79, and when rack 32 is drawn down, lever 79 pulls down also a vertical link 76 attached thereto by a pin 77.

The upper end of link 76 is connected by a pin 75 to yet another horizontal lever 74, at the opposite end of which is a pin 95 which may be regarded as a fixed pivot for lever 74 for the purpose of the present portion of the description.

With pin 95 in fixed position, lever 74 rocks thereabout when link 76 is drawn down, and another vertical link 71, attached thereto by a pin 72, is vertically displaced. It was said above that link 71 was pivoted to horizontal lever 64 by a pin 70; therefore, when link 71 is pulled down, lever 64 must pivot on its bearing 65 and the opposite end pin 62, which may be regarded as a fixed pivot for the purpose of the present portion of the description; so bearing 65 in lever 66 must be vertically displaced when link 71 is drawn down. This causes lever 66 to pivot about its fixed bearing support 67 in block 69, and moves the H. P. pointer just as above described in connection with R. P. M. change.

The effect of increasing both M. P. and R. P. M., as set forth in Equation 5, is transmitted by the scissor linkages or multiplying mechanism which will next be described, and which may be understood by referring to Figures 1 and 4.

In brief, the scissor linkages or multiplying mechanism operate by lowering the fixed pivot 58, and hence increasing the vertical displacement of connecting rod 60 which will be effected by a given displacement of connecting rod 52. The linkages consist of three horizontal levers 49, 47, and 86, of equal length. Lever 49 is carried by a bearing 50 pivotally mounted in a fixed supporting block 51 attached to the plate 6. At its opposite end, a pin 48 ties lever 49 to lever 47 and to a second connecting rod 46 attached to the R. P. M. rack 31. Lever 47, at its end opposite pin 48, is pivotally connected by a pin 88 to lever 86 and to a link 85 pivotally joined to the horizontal lever 79 at the point of attachment 82 of the connecting rod 84 leading to the M. P. rack 32. Pin 88 is coaxial with bearing 50 when the M. P. value is at the test value of 24 in. Hg, as shown in Figure 1; but such coaxiality might occur at any scale value depending upon the scale range selected and the characteristics of the motor on which the instrument design is based. It will occur in any case at the scale values of M. P. and R. P. M., which will make the result of Equation 5 equal to zero.

At its end opposite pin 88, lever 86 is connected by a pin 87 to the lower arm 89 of bell crank 59. As bell crank 59 is turned about its fixed pivot 90 in supporting block 91, vertical link 55 is displaced.

Drawing down only the R. P. M. rack 31, as shown in Figure 2, causes no change in the vertical position of link 55, when the pivot 50 of lever 49 and the pivot 88 of lever 47 are coaxial as shown in said figure. Likewise, drawing down only the M. P. rack 32 causes no change in the vertical position of link 55 when the pivot 48 of levers 47 and 49 and the pivot 87 of lever 86 on arm 89 of bell crank 59 are coaxial. This specific position is not shown in the drawings, however, because the scale of the R. P. M. pointer has been extended to 1500 R. P. M. by extrapolation which is below the test value of 1650 R. P. M., and the rack 31 is shown only in its minimum and maximum scale value positions.

When both R. P. M. and M. P. racks are drawn down, as in Figure 4, link 85 forces pivot 88 away from its position coaxial with bearing 50, and draws down also the associated end of lever 86 rocking lever 47 about pivot 48. Since the positions of pivots 50, 48, and 88 are held by their associated linkages, the lever 86 must rock bell crank 59 clockwise to accommodate the vertical displacement of pivot 88. Vertical link 55 is displaced downwardly, and the combination effect of M. P. and R. P. M. is then carried to the pointer 17 through rod 60 and the linkage previously described.

Altitude correction, in accordance with Equation 7, is proportional to the altitude, and is inserted through rack 34 (Figure 1) and connecting rod 81, which acts to control movement of horizontal lever 79, through pin 80, about pin 82 as a fixed pivot, and to displace link 76 vertically. The sequence thereafter is identical with that for M. P. change in the way it reaches the H. P. pointer.

Temperature correction, by Equation 8, is proportional to the H. P. and to the deviation of the carburetor temperature from standard temperature for the given altitude. It is introduced by setting a bell crank 100 which is controlled by connection both to the H. P. as totaled by the other variables, and to the temperature and altitude racks 35 and 34 respectively, which are connected together in such a way as to give the deviation of the carburetor temperature from standard altitude temperature. These two factors, H. P. and T$^d$, are combined by a scissors linkage which directly controls the position of bell crank 100, which in turn sets the correction into the H. P. indicator through connecting rod 96 pivotally connected thereto at 97 and to lever 74 at 95.

The H. P. factor is taken from lever 66 by a vertical link 112 connected thereto by a pin 114. A pin 107 joins link 112 to one end of scissor links 109 and 106 of equal length. The opposite end of link 109 which may be considered as a guide element is supported pivotally by a bearing 110 in fixed pivot block 111. The opposite end of link 106 is pivotally connected by pin 105 to the third scissor link 104 of the same length, and to a vertical link 186 joined by a pivot pin 187 to a horizontal lever 182. A second connecting rod 180 is attached to the rack 34, and connected by a pin 181 to horizontal lever 182. At its opposite end, lever 182 is pivotally attached by pin 184 to the connecting rod 185 pivotally secured to the T. rack 35. The position of pin 187 is such that no vertical displacement occurs for any value of A., providing the T. value is standard. If the T. value is standard in relation to A., the pivots 105 and 110 will be coaxial and the displacement of pivot 107 will not change the position of the bell crank 100.

Figure 4:
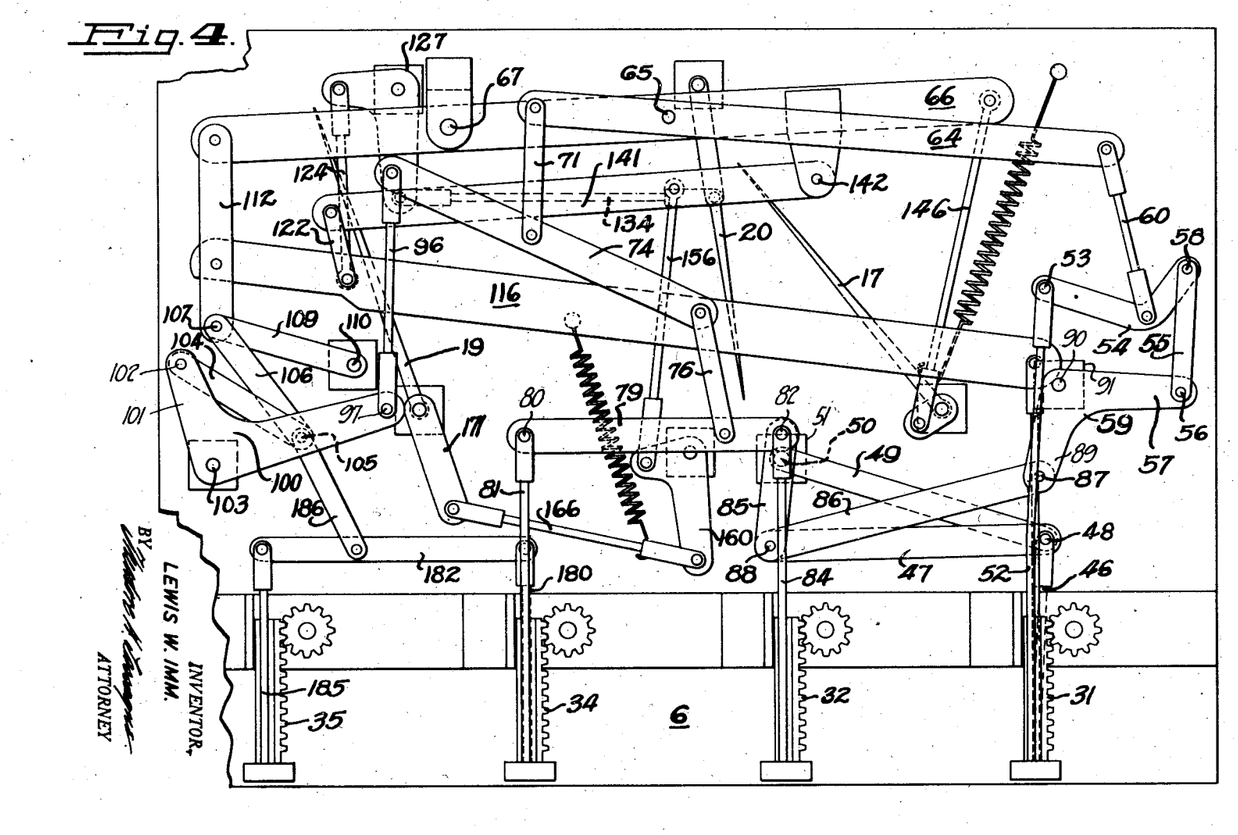
Figure 4 is a rear plan view showing the linkages with the R. P. M., M. P., A., and T. indicators set at maximum values.

If the temperature is not at standard value, the linkage positions may be as shown in Figure 4, for example. Here the altitude is set at maximum, and likewise the temperature. Actually, standard temperature for 25000 elevation is −30° F., and so a negative correction for the difference between −30° F. and +140° F. must be made. Link 186 has been drawn down, causing scissor link 106 to pivot about 107, which is fixed by the total H. P. value, thus forcing link 104 to rock bell crank 100 counter-clockwise, raising link 71 and reducing the indicated H. P. by forcing lever 66 to pivot about 67.

If we move the R. P. M. pinion 26 from the position shown in Figure 1 to that shown in Figure 2, the parts 52, 53, left-hand end of lever 54, rod 60, pin 62, right-hand end of lever 64, pin 65, and the right-hand end of lever 66 are also lowered to increase the reading on the H. P. pointer 17. However, as the right-hand end of the lever 66 is lowered, its left-hand end 114 is raised, thereby elevating link 112, pin 107 and the left-hand end of links 106 and 109, thereby increasing the distance between pins 107 and 102. If the pin 107 is raised, it moves in an arc of a circle around the point 110 so that link 106 is pushed to the right, thereby rotating the lever 100 clockwise through link 104. This clockwise rotation of lever 100 lowers the parts 97, 96, 95, 72, 71, 70 and 65, thereby further lowering the right-hand end of lever 66. It will, therefore, be noted that the regenerative mechanism feeds back an additional movement which is additive to what would have been the movement of the right-hand end of the lever 66 if there had been no regenerative mechanism.

If the parts are in the position shown in Figure 1, and we rotate pinion 30 so as to lower 185, 184, 187, 186 and 105, the link 104 is moved to the left rotating lever 100 anti-clockwise and raising 97, 96, 95, 72, 71, 70 and 65, thereby raising the right-hand end of lever 66 and lowering 114, 112 and 107, which gives an additional movement to the left of the link 104, thereby feeding back an additional additive movement to the right-hand end of lever 66. Of course, if we simultaneously rotated pinions 26 and 30 so as to lower racks 31 and 35, the movement of rack 31 would tend to lower the right-hand end of lever 66 and increase the H. P. reading, while the movement of rack 35 would tend to raise the right-hand end of lever 66 so that the resultant movement of the H. P. indicator 17 would be the difference between these movements.

The regenerative mechanism, however, is not necessarily additive. For instance, suppose the parts are in the position shown in Figure 1, and suppose pinion 29 is rotated to lower rack 34 and rods 180 and 81. Rod 81, as it moves downwardly, lowers parts 80, left-hand end of lever 79, 77, 76, 75, right-hand end of lever 74, link 71, left-hand part of lever 64, pin 65, thereby lowering right-hand end of lever 66, thereby tending to increase the reading of the H. P. pointer 17. However, the lowering of rod 180 lowers the right-hand end of lever 182, pin 187, link 186 and pin 105, thereby through link 104 locking lever 100 anti-clockwise and raising 97, 96, 95, left-hand end of lever 74, 71, left-hand end of lever 64 and pin 65, thereby raising the right-hand end of lever 66, thereby tending to decrease the reading of the H. P. pointer 17. In this case the regenerative mechanisms act subtractively.

The mechanism, therefore, whereby the initial movement of one part is fed back through mechanism so as to vary the movement of the said part over that initially imparted to it is called a regenerative mechanism, this term being suggested by the well-known feed back or regenerative electric circuit in a feed back amplifier.

Consideration of the additional linkages required to actuate the B. M. E. P. and F. C. pointers will be deferred until the method of designing the proper linkage and lever lengths, and the calibration of the R. P. M., M. P., A., and T. scales is explained.

It is obvious that the full range of H. P., and R. P. M., values possible need not be provided for on the scales, for example; since in normal operation the speed and power never drop to zero. The R. P. M. scale need extend, in the case of the instrument here described, as an example, only from 1500 to 2700. Similarly, the pointers will usually be indicating readings intermediate the test ranges, so it is preferred to assume vertical pointer positions for H. P., F. C., and B. M. E. P., near the most common values, and arrange the mechanism to subtract from or add to the values indicated in accordance with the R. P. M., M. P., A., and T. settings.

In design, first we must find the effect of each of the variables, as determined from Equations 6, 7, and 8, over the full range for which calibration of scales 12, 14, 15, and 16 is desired, in terms of H. P. variation from the base value of power for standard altitude temperature at sea level, which in the present example has been taken as 343 H. P.

From Equation 6:

$$H.P. = 343 - \left\{ \left[ 1 + .5\left(\frac{2550-1500}{900}\right) \right] \times .1966(1500-1650) \right\} + 25.92(20-24) + \{.00496(1500-1650)(20-24)\}$$

which reduces to:

$$H.P. = 343 + \{1.584 \times (-29.5)\} + 25.92(-4) + .00496(-150)(-4)$$

giving a base value of H. P.=195.5, with base values of 20 for M. P., zero altitude, and standard temperature. Actually the scale maximum is carried to 140° F., and by Equation 8, the correction for the range between T. and standard temperature, +59° F., is:

$$\epsilon H.P. = .00105(150-59)(195.5)$$

which in view of the fact that the temperature correction is fed in regeneratively, the movement of lever 66 by connecting rod 96 effecting further movement of the temperature correction linkages through link 112, should be stated:

$$\epsilon H.P. = .00105(91)(195.5 + \epsilon H.P.)$$

As a mathematical equation this is capable of solution only by successive integrations, but it will be apparent from the foregoing description of the temperature correction linkages that the equation is solved simultaneously by the regenerative mechanism described. The approximate solution is $$\epsilon H.P. = 16.9$$

and this gives $$\text{Base H. P.} = 195.5 - 16.9 = 178.6 \qquad (10)$$

To find next the maximum value, by Equation 6:

$$H.P. = 343 + \left\{ \left[ 1 + .5\left(\frac{2550-2700}{900}\right) \right] \times .1966(2700-1650) \right\} + 25.92(45-24) + \{.00496(2700-1650)(45-24)\}$$

which reduces to:

$$H.P. = 343 + \{[.9167] \times 206.4\} + 544.3 + \{109.4\}$$
$$H.P. = 1185.9$$

Correcting for altitude by Equation 7 at 25,000 feet:

$$\Delta H.P. = 50\left(\frac{25,000}{10,000}\right)\left(2.1 - \frac{25,000}{50,000}\right)$$
$$= 50 \times 2.5 \times 1.6$$
$$\Delta H.P. = 200, \text{ which gives}$$
$$H.P. = 1185.9 + 200 = 1385.9$$

Correcting for temperature by Equation 8, standard temperature being −30° F. at 25,000 feet, and the scale minimum being −60° F., we have $$\epsilon H.P. = .00105[-60-(-30)](1385.9)$$

which in view of the fact that the correction is fed in regeneratively should be stated:

$$\epsilon H.P. = .00105(-30)(1385.9 + \epsilon H.P.)$$

giving an approximate mathematical solution:

$$\epsilon H.P. = 45.0$$
$$H.P. = 1389.9 + 45 = 1430.9$$

which gives

Thus the total range of power over the full scale range of variables is from the base value of 178.6 to the maximum of 1430.9 H. P. Of this range, the components, as derived above, are:

| Factor | R. P. M. | M. P. | R. P. M. and M. P. | A. | T. |
|---|---|---|---|---|---|
| Range of scales | 1,500 to 2,700 | 20 to 45 | 1,500 to 2,700 and 20 to 45 | 0 to 25,000 | (+140) to (−60) |
| H. P. deviation values at scale limits | −46.8 to 189.2 | −103.7 to 544.3 | 3.0 to 109.4 | 0 to 200 | (−16.9) to (+45) |
| H. P. deviation total | 236.0 | 648.0 | 106.4 | 200 | 61.9 |

The next step is to proportion the linkages to give these changes on the H. P. dial for full scale settings of each variable. Consider the M. P. and A. rack movements: the full vertical displacement of M. P. rack 32, should cause a change of 648 H. P. in the position of pointer 17, while the A. rack 34 must act to change pointer 17 by 200 H. P. Lever 79 must contribute a motion to the pointer 17 equivalent to 648+200, or 848 H. P., when racks 32 and 34 are in maximum position. To find the proper position of pivot 77 with relation to pivots 80 and 82, the length of link 79 being known, a proportion is set up between the ratio of the length of link 79 to the H. P. change accounted for by full deflection thereof, and the ratio of the distance from pivot 80 to pivot 77 to the H. P. change due to M. P. change, which is also equal to the ratio of the distance between pivot 82 and pivot 77 to the H. P. change due to A. change.

Full deflection of the rack 35 produces, through the scissor linkage associated with bell crank 100, a vertical displacement of rod 96 and pivot 95, which represents 261.2 H. P. change.

Thus full displacement of racks 32, 34, and 35 moves link 71 a distance representing $$261.2 + 648 = 909.2 \text{ H. P.}$$

The H. P. variation range for movement of link 71 is now 626+848=1474 H. P.

On rack 31, the full deflection is modified by the M. P. scissors acting through bell crank 59, and by the differential lever 54. Link 55 has a vertical deflection for full scale M. P. change, which adds 106.4 H. P. to the effect of R. P. M.

In deriving Equation 9, it was found that the multiplying factor required to bring the average figures for increase of H. P. with R. P. M. into agreement with test curves was 1.584 at the lowest R. P. M. value, decreasing to 1−.0833, or .917 at maximum R. P. M. Lever 54 is designed so that the rate of vertical movement of connecting rod 60 in proportion to that of pivot 53 is $$\frac{1.584}{.917}$$

or 1.73 times as great at the lower end of the R. P. M. scale as at the upper, tapering off gradually in between to solve the factor $$\left[1 + .5\left(\frac{2550 - \text{R.P.M.}}{900}\right)\right]$$

The full scale movement of rod 52 was equal to 236.0 H. P., and hence the rod 60 adds $$236.0 + 216 = 452 \text{ H. P.}$$

Now it will be seen that the vertical displacement of pivot 65 is proportional to the combined H. P. variations, and it is a simple matter to relate the lengths (67—65) and (67—145) of lever 66 so that pointer 17 will have the proper travel over the full H. P. range.

Returning now to the linkages controlling the F. C. and B. M. E. P. pointers, consider first the equation governing the former. The rate of consumption varies with horsepower delivered and R. P. M., and test results can be accurately approximated by following the equation $$\text{F. C.} = a(\text{R. P. M.}) + b(\text{H. P.}) - C \quad (11)$$

where $$a = .00775, \ b = .0624, \text{ and } C = 7.6$$

for this engine.

Hence the F. C. pointer must be actuated by connection to a part of the linkage system moving proportionately with R. P. M., and to another part moving with H. P. Connecting rod 119 (Figure 1) is fixed to R. P. M. rack 31 through block 41, and is attached by a pin 117 at its upper end to a horizontal lever 116, the opposite end of which is connected by a pivot 115 to vertical link 112.

For R. P. M. rack movements, pivot 115 acts as a fixed center, and a movement proportional to that of the rack 31 is carried by a vertical link 122, pivotally connected to lever 116 by a pin 121, and to a lever 141 by a pin 140. Lever 141 is supported nearly parallel to lever 66 by the link 122 and a pivot 142 at the opposite end, which connects with an extension 144 from the lever 66. This connection, together with the connection comprising link 112 and pivot 115 supplies the movement proportional to H. P. Lever 141 is pivotally connected to a connecting rod 156 by a pin 155, and rod 156 is pivotally attached at its lower end by a pin 157 to the upper arm 159 of a bell crank 160, rockably supported at 161 in a fixed block 162 fixed to plate 6. The lower bell crank arm 164 is pivotally attached by pin 165 to a connecting rod 166 pivotally connected at 170 to a lever 171. Lever 171 is fixedly attached to a shaft 172 journaled in a bearing block 174 fixed on plate 6. F. C. pointer 19 is fixed to the shaft 172. Thus, the F. C. pointer is moved in accordance with the Equation 11 above. The relative proportions of the levers may be calculated in a manner similar to that shown above in computing the H. P. leverages, reducing the vertical travel of points 142, 117, and 115 to equivalent effects in terms of F. C. variation.

B. M. E. P. is most conveniently indicated in variations from the optimum point, since it is desired to operate the engine at, or just slightly below, a certain value. This range is indicated on scale 23 by the zone 24. Rewriting Equation 1, $$\text{B.M.E.P.} = K \times \frac{\text{H.P.}}{\text{R.P.M.}} \quad (12)$$

where K is a constant for any given engine.

The pointer 20 is hence connected to a lever joined at opposite ends to parts of the linkage moving in one direction for increase of H. P., and in the opposite direction for increase of R. P. M., adjusting the lever lengths to hold pointer 20 in a certain position for constant B. M. E. P. values. Lever 116 is displaced downward at pivot 117 for R. P. M. increase, and upward at 115 for H. P. increase. Reducing the vertical movement of point 115 to equivalence with that of point 117, the effects of H. P. and R. P. M. in terms of B. M. E. P. may be equated to obtain the lever lengths (115—121) and (121—117) in the specific engine under consideration.

A connecting rod 124 is attached to the lever 116 by pin 121, and at the upper end of the rod a pin 125 supplies connection to the horizontal arm 126 of a bell crank 127 rockably pivoted at 129 on a fixed block 130 attached to plate 6. Lower arm 131 of crank 127 is attached by a pin 132 to a horizontal connecting rod 134, pinned at 133 to the B. M. E. P. pointer 20, which is pivotally supported at 136 by a block 137 fixed to plate 6. The comparative lengths of bell crank 127, arms 126 and 131 can easily be proportioned to produce the desired movement of pointer 20 for given B. M. E. P. changes.

Attention is next directed to Figure 2 of the drawings, in which the respective linkage positions are shown for maximum R. P. M., with all of the remaining values remaining at the minimum. The position of bell crank 59 is unchanged, since the scissor links 47 and 49 are of equal length and hence link 86 is unaffected by movement of rack 31. Pointers 17 and 19 are indicating increased power and fuel consumption but pointer 20 indicates operation below the best efficiency and B. M. E. P. value. It will be noticed that the temperature correction through bell crank 100 is increased slightly, although the position of the temperature rack 35 is unchanged. This follows from Equation 8, since the change is proportional, not only to the deviation from standard temperature, but also to the total H. P. developed.

In Figure 3, the effect is shown of increasing the M. P. to maximum, holding R. P. M., A., and T. at their minima. Power and fuel consumption are increased over the showing in Figure 2, substantially, and the operation is more efficient, as shown by the position of pointers 17, 19, and 20. A temperature correction is added through the bell crank 100 by the scissors links 104, 106, and 109, for the same reason as given above in the case of R. P. M. increase. The increase in H. P. is transmitted to pointer 17 through lever and links 79, 76, 74, 71, 64, and 66 from the rod 84 connected to rack 32. At the same time, scissor action between links 47, 49, and 86, through link 85, rotates bell crank 59 and elevates pivot 56. Link 55 rotates about pivot 56, causing crank 54 to rock on pin 53 as a center, raising rod 60 to effect the combination M. P.—R. P. M. correction of Equation 5.

In Figure 4 racks 31, 32, 34, and 35 are all in maximum position. The M. P. effect on H. P. is carried through the same sequence of levers as in Figure 3, and arm 57 of bell crank 59 is drawn down and the pivot 58 lowered to add in the combination effect of R. P. M. and M. P. changes, while connecting rod 52 inserts the change due to R. P. M. alone in the same fashion as in Figure 2 through pivot 53. Scissor links 104, 106, and 109 are adding a large temperature correction, standard temperature being 170° F. less than the setting indicated. It should be noted that the temperature rack functions by affecting the position not only of links 104 and 106 in relation to bell crank 100, but also of links 106 and 109 in relation to the vertical position of link 112, through the rotation of link 109 about fixed pivot 110.

It will be apparent that reliance is placed on the ability to bend the connecting rods in accommodating the rack movements to those of the various levers. It will also be seen that the movements of some of the connecting rods and links is not in a straight vertical line, but rather along arcs of circles. These arcs are relatively small, however, so that the error in vertical displacement is small. Compensation is also provided by making the horizontal separation between pairs of pivots greater than that between their corresponding operating members.

For example, the separation between pivots 80 and 82 is greater than the center-to-center distance between racks 34 and 32. If rack 34 is drawn clear down while rack 32 is at minimum, pivot 77 is drawn down in an arc about pivot 82, so that the vertical displacement of pivot 77 would not equal that of rack 34. Since the connecting rods are resilient, however, rod 84 will bend to the left, restoring pivot 77 to its original vertical line of travel, and substantially correcting the error.

It will be apparent that the positions of the fixed pivots and indicating pointers may be changed at will, and that linkage arrangements may be designed in accord with the same principles to fit any such variation. Any materials may be used having the requisite characteristics of strength, resilience, and workability.

In summary, the invention provides means for mechanically computing simultaneously the B. M. E. P., H. P., and F. C., of an internal combustion engine, by setting in observed values of R. P. M., M. P., A., and T. The design will differ for engines having different characteristics, and is based on empirical equations derived from test data, since simple, theoretical equations can not be used to cover all the factors affecting performance. The computed values are obtained by mechanically adding the effects on each of these values of the inserted variables.

While the invention has been described with particular reference to airplane engines, it will be obvious that it could be applied to any type of engine for which performance tests were available, and to engines used in any type of service. All such uses and modifications are deemed to be within the scope of the appended claims.

I claim:

1. In a computer of the type described, a plurality of differentially settable elements by means of which values may be entered, a first movable indicating device, connecting mechanism between said elements and said device for moving said device, a second movable indicating device, and connecting mechanism between a part of the first connecting mechanism, and said second device for moving said second indicating device an amount proportional to the differential movements of said first device and said part; a third movable indicating device, and connecting mechanism between one of the elements of the second named connecting mechanism and said third device for moving said third indicating device an amount proportional to the difference of the differential movements of said first device and the said element of the second named connecting mechanism.

2. A motion transmitting linkage for calculators comprising, a pivotally supported guide element, a first movable link having a pivotal connection with said guide element radially spaced from the pivotal support thereof, a second movable link having a pivotal connection with said first link radially spaced from the pivotal connection of said first link with said guide element, a first movable member having a pivotal connection with said second link radially spaced from the pivotal connection between said links; all of said radial spacings being equal; a second movable member having a pivotal connection with said links coaxial with the aforesaid pivotal connection between them, a third movable member connected to said guide element, an input element connected to said third movable member and means connecting the first movable member to said input element whereby the movement of the input element is modified through said links, said members and said guide element.

3. In a computer, setting means to introduce values corresponding to engine speed and manifold pressure, means actuated by the said setting means to multiply a function of manifold pressure by a function of engine speed, an addition lever, means connecting said lever and the engine speed setting means so as to move one end of said lever according to a function of engine speed, means to actuate the other end of said lever by said multiplying mechanism, a link connected to an intermediate portion of said addition lever, a second lever connected to one end of said link, means connecting the other end of said second lever to the manifold pressure setting means, a horsepower indicator, and means connecting an intermediate portion of said second lever to said indicator.

4. In a computer, setting means to introduce values corresponding to engine speed, manifold pressure, altitude and temperature, a lever, means actuated by said setting means to calculate horsepower and to actuate said lever in accordance with the horsepower calculated, a horsepower indicator, means connecting said lever to said indicator, a second lever, means connecting one end of said second lever to said first named lever so as to actuate said end of said second lever an amount corresponding to a function of horsepower, a third lever, means connecting the other end of said second lever to said third lever, means whereby one end of the third lever is actuated by the engine speed setting means, means whereby the other end of said third lever is actuated by said first named lever, a fuel consumption indicator, and means connecting said second lever to said fuel consumption indicator.

5. In a computer, setting means to introduce values corresponding to a first quantity and a second quantity, means actuated by the said setting means to multiply a function of said first quantity by a function of said second quantity, an addition lever, means connecting said lever and said first quantity setting means so as to move one end of said lever acoording to a function of said first quantity, means to actuate the other end of said lever by said multiplying means, a link connected to an intermediate portion of said addition lever; said addition lever being so shaped as to effect angular adjustment of said link at a progressively varying rate as said addition lever is angularly adjusted by said setting means, a second lever connected to one end of said link, means connecting the other end of said second lever to said second quantity setting means, a registering element, and means connecting an intermediate portion of said second lever to said registering element.

6. In a computer, setting means to introduce values corresponding to a first quantity, a second quantity and a third quantity, means to add a function of the value set by the second quantity setting means to a function of the value set by the third quantity setting means, a lever, means to actuate one end of said lever by the value of said sum, means actuated by said second quantity setting means and by said first quantity setting means to actuate the other end of said lever by the sum of a function of the first quantity plus the product of a function of the first quantity multiplied by a function of the second quantity, a registering element, and means connecting said lever to said registering element.

7. In a computer, a movable indicating device, factor entering means, operating connections including a lever interconnecting said device and said factor entering means, a regenerative linkage, a connection from said lever for operating said linkage, and another connection between a fulcrum of said lever and said regenerative linkage for effecting adjustment of the fulcrum of said lever, said regenerative linkage including adjustable means to vary the magnitude of the motion transmitted to the fulcrum of said lever.

8. In a computer, a movable indicating device, factor entering means, operating connections including a lever interconnecting said device and said factor entering means, a regenerative linkage, a connection from said lever for operating said linkage, and another connection between a fulcrum of said lever and said regenerative linkage for effecting adjustment of the fulcrum of said lever.

9. In a computer, an indicating device, actuating mechanism therefor, a pair of factor entering means, summation means operated by said factor entering means and connected to an element of said actuating mechanism for operating same, regenerative means including three interconnected links actuated by said element of said actuating mechanism, and a connection from said regenerative means to said summation means for imparting a supplementary movement to said summation means.

10. In a computer, an indicating device, actuating mechanism therefor, a pair of factor entering means, summation means operated by said factor entering means and connected to an element of said actuating mechanism for operating same, regenerative means including three interconnected links actuated by said element of said actuating mechanism, a connection from said regenerative means to said summation means for imparting a supplementary movement to said summation means, and adjustable means in said regenerative means to vary the rate of said supplementary movement.

11. In a computer, a movable indicating device, factor entering means, operating connections intermediate said entering means and said indicating device for operating the same, including a pivoted lever and a second lever pivoted on said first lever, a regenerative linkage, means for operating said linkage from said first lever, and connections from said regenerative linkage to said second lever for transmitting a supplementary movement to both of said levers whereby a composite actuation of said indicating device is effected.

LEWIS W. IMM.